United States Patent [19]

Rebsdat et al.

[11] 3,926,989

[45] Dec. 16, 1975

[54] PROCESS FOR THE PREPARATION OF ARYL-1,1,2,2-TETRAFLUOROETHYL ETHERS

[75] Inventors: Siegfried Rebsdat, Altotting; Helmut Hahn, Burghausen, both of Germany

[73] Assignee: Hoechst Aktiengesellschaft, Frankfurt am Main, Germany

[22] Filed: June 14, 1971

[21] Appl. No.: 152,600

[30] Foreign Application Priority Data
June 16, 1970 Germany............................ 2029556

[52] U.S. Cl.. 260/247.7 C; 260/293.83; 260/562 A; 260/574; 260/575; 260/600; 260/613 D; 260/612 R; 260/612 D
[51] Int. Cl.$^2$........................................ C07C 41/06
[58] Field of Search ........... 260/612, 562, 571, 574, 260/575, 247.7, 293.83, 600

[56] References Cited
FOREIGN PATENTS OR APPLICATIONS
2,005,876   12/1969   France................................ 260/612

*Primary Examiner*—Harry I. Moatz
*Attorney, Agent, or Firm*—Connolly and Hutz

[57] ABSTRACT

Phenols react with tetrafluoroethylene at normal or reduced pressure when using about 0.05 to about 0.5 mole of an alkali metal hydroxide per each equivalent of phenolic hydroxy group as a catalyst and a water-miscible polar inert solvent to yield aryl-1,1,2,2-tetrafluoroethyl ethers. The products are useful as intermediates in the synthesis of dyestuffs and plant-protecting agents.

9 Claims, 1 Drawing Figure

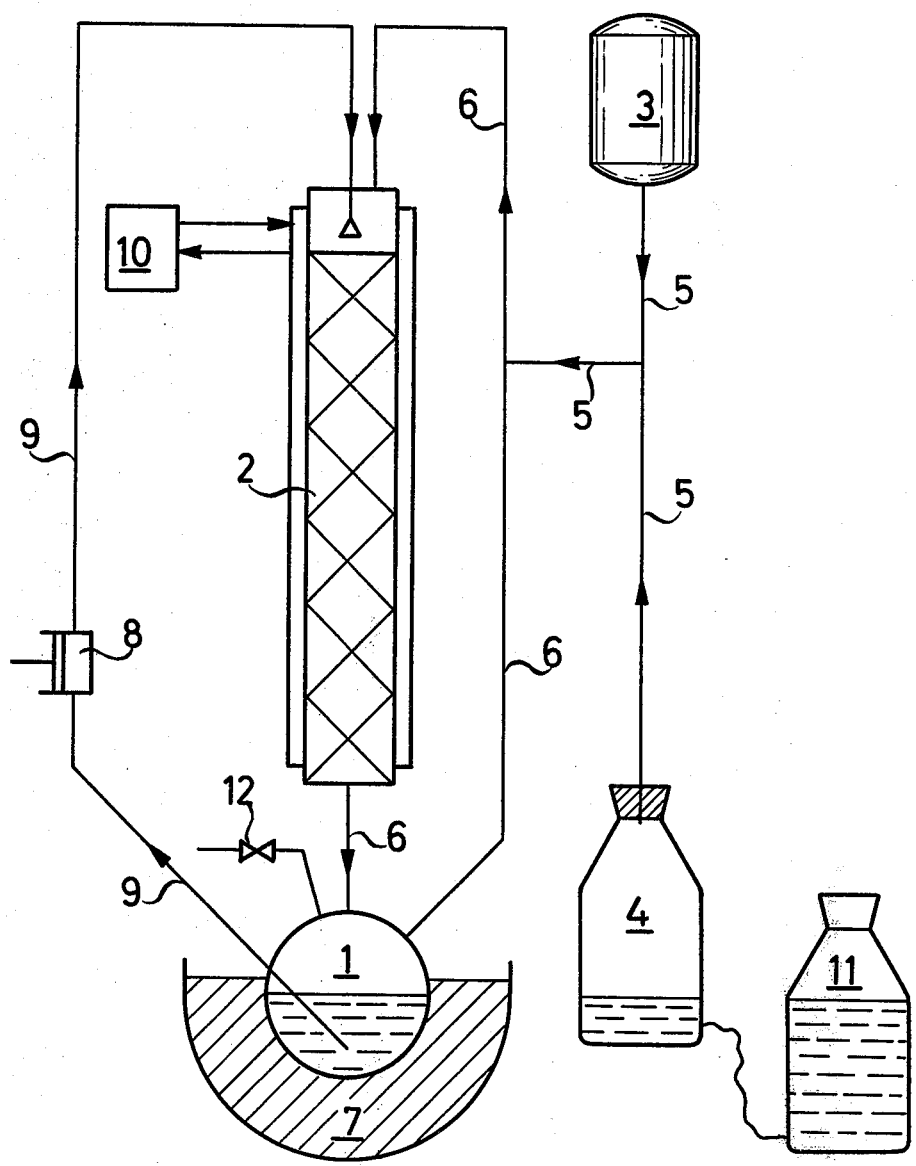
INVENTORS
SIEGFRIED REBSDAT
HELMUT HAHN

PROCESS FOR THE PREPARATION OF ARYL-1,1,2,2-TETRAFLUOROETHYL ETHERS

The present invention relates to a process for the preparation of aryl-1,1,2,2-tetrafluoroethyl ethers by reacting phenols with tetrafluoroethylene in organic solvents in the presence of alkaline catalysts, comprising contacting a solution of about 5 to about 50 percent by weight of the phenol in water-miscible, polar solvents inert towards tetrafluoroethylene under the reaction conditions, preferably dimethylformamide, hexamethyl-phosphoric acid trisamide of dimethylsulfoxide, in the presence of about 0.05 to about 0.5 mole of an alkali metal hydroxide per equivalent of phenol at normal pressure or slightly reduced pressure and temperatures of from about 50° to about 150°C with tetrafluoroethylene.

From U.S. Patent specification it is known that phenyl-1,1,2,2-tetrafluoroethyl ether may be prepared by addition of tetrafluoroethylene to phenols. In the single example concerning phenol the reaction is carried out in the course of about 12 hours at 100°C under pressure in the autoclave in the presence of metallic sodium as catalyst and benzene as solvent. The phenyl-1,1,2,2-tetrafluoroethyl ether is obtained with a yield of 4.6 percent.

D. C. England et al. (J. Am. Chem. Soc. 82, 5116 - 2122 (1960)) have found an improvement to this process, using dimethylformamide or dioxan as solvents, the operation being carried out under pressure (2–2.7 atmospheres gauge) and at temperatures of from 60° – 100°C. Instead of metallic sodium, W. A. Sheppard (Journal of Organic Chemistry 29, 1 – 11 (1964)) employed in this process sodium hydride in dispersed form.

The reaction of sodium phenolate with tetrafluoroethylene in dimethylformamide under a relatively high pressure the sodium phenolate being formed in situ from phenol and sodium, is described in U.S. Pat. No. 3,277,068.

From Belgian Patent specification No. 741,243 it is known that phenols may be reacted under pressure with tetrafluoroethylene in the presence of alkali metal hydroxides or alkali metal phenolates, if a certain amount of water is present and a certain critical molar ratio of tetrafluoroethylene to phenol is maintained. In the Belgian Patent specifications Nos. 691,603 and 691,604 there is also mentioned the reaction of nitro- or aminophenols with tetrafluoroethylene under pressure in the presence of alkali metal or alkaline earth metal hydroxides, sodium hydride or sodium methoxide as catalyst and dimethylformamide or dioxan as solvents.

All these processes have the disadvantage that the operation must be carried out under pressure, which takes expensive security measures due to the easy explosive decomposition of tetrafluoroethylene.

It has therefore been desirable to find a process which may be performed without pressure and with a catalyst easily to be handled and which renders superfluous the use of anhydrous solvents. Experiments of this type have hitherto been fruitless. Thus, J. W. C. Crawford (J. Chem. Soc. 1967, 2396) has stated that phenol in the presence of sodium phenolate — formed in situ from sodium metal and phenol — and dimethylsulfoxide or dimethylformamide does not react with tetrafluoroethylene at normal pressure.

It has therefore been surprising that tetrafluoroethylene easily reacts with phenols at normal pressure to form the corresponding aryl-tetrafluoroethyl ethers in good yields, if instead of the metallic sodium or sodium hydride an alkali metal hydroxide is used as catalyst and if water-miscible, polar solvents, preferably dimethylformamide, hexamethyl-phosphoric acid trisamide or dimethylsulfoxide are used. The reaction proceeds so easily that the reaction may be carried out even at a slightly reduced pressure.

As phenolic starting compounds there may also be considered besides phenol mono-, di- and trisubstituted phenols. As substituents in the phenyl nucleus there are especially preferred: straight-chain or branched alkyl groups having preferably up to 20, especially up to 4 carbon atoms, hydroxy, alkoxy groups having up to 6, especially up to 4 carbon atoms, formyl, amino, alkylamino and dialkylamino-groups having preferably up to 4 carbon atoms in each alkyl moiety, as well as the piperidino and the morpholino group and alkanoylamino groups having up to 6 carbon atoms, especially acetamino groups. Furthermore there may be used polynuclear phenols, such as the naphthols.

The solvent is not necessarily anhydrous and may be used without difficulty in a technical quality. The phenol is dissolved in this solvent in a concentration of about 5 to about 50 percent by weight, preferably about 15 to about 20 percent by weight. As catalysts there are used alkali metal hydroxides, preferably potassium hydroxide, in amounts of from about 0.05 to about 0.5, preferably about 0.15 to about 0.3 mole, per equivalent of phenol, which are dissolved in the phenolic solution. One "equivalent of phenol" is a mole of phenol divided by the number of the phenolic hydroxy groups in the phenol molecule. The mentioned amounts of catalyst have therefore to be referred to "mole of phenolic hydroxy groups."

The reaction may be carried out by passing tetrafluoroethylene over the intensively stirred reaction mixture heated to about 50° to about 150°C, preferably to 70°– 130°C. The reaction proceeds more rapidly, if the phenolic solution is passed over a heated packed column and the tetrafluoroethylene is introduced into this column at normal pressure, where it is absorbed.

The reaction speed is different for the different phenols. In many cases the reaction is exothermic; it is completed, if the absorption of tetrafluoroethylene is finished.

The reaction products are usually isolated by distillation of the obtained mixtures, the solvent being recovered or by treating the reaction mixture with water; the reaction product is precipitated and the solvent as well as the catalyst are transferred into the aqueous phase.

The following Examples illustrate the invention.

EXAMPLE 1

The o-sec.-butylphenol was reacted with tetrafluoroethylene in the device represented by FIG. 1. For this purpose, 75 g (0.5 mole) of o-sec.-butylphenol were dissolved in 240 g of dimethylformamide and 7 g (0.125 mole) of KOH were added. The whole was stirred until a solution was obtained, heating being optionally necessary. The resulting solution was filled into the flask (1) of the reaction device. The flask (1) and the column (2) were rinsed with nitrogen from the pressure vessel (3) and then with tetrafluoroethylene from the stock vessel (4) over the feed lines (5) and (6). Then the flask (1) (by means of the heating bath (7)) and the column (2) were heated to 90°C. The pump (8) was started, so that the solution trickled over the feed line (9) through the column (2). The inner temperature regulated by the thermostat (10) amounted to 87°C. After starting the pump (8), the consumption of tetrafluoroethylene began immediately. The levelling vessel was so adjusted that the pressure was not far below normal pressure. (12) is an outlet valve. By the exothermic reaction, the temperature increased to 100°C. After 18 minutes the absorption of tetrafluoroethylene was completed.

The reaction product was obtained with a 99 percent purity by precipitating with water, drying with $Na_2SO_4$ and subsequent fractionation. (115 g (92 percent) of 1-tetrafluoroethoxy-2-sec.-butyl-benzene, boiling point $_{20}$94°C, $n_D^{25}$ 1.4314).

The reaction products of other phenols with tetrafluoroethylene obtained in analogous way are listed in Table 1 as Examples 2 to 18.

Table 1

| Example No. | Product | charge Phenol (mole) | catalyst (mole) | solvent (g) | reaction temperature (0°C) | reaction time (min.) hours | yield % of the theory | boiling point (°C) mm | melting point (°C) |
|---|---|---|---|---|---|---|---|---|---|
| 2 | OCF$_2$·CF$_2$H on benzene | 1.0 | KOH (0.2) | DMF (250) | 94–95 | 45 / 2 | 75.2 | 85 | 86.5 |
| 3 | " | 0.5 | KOH(0.125) | DMSO(240) | 93–94 | 34 / 0 | 73.3 | | |
| 4 | OCF$_2$·CF$_2$H, NH$_2$ on benzene | 0.5 | KOH(0.125) | DMF (240) | 93–100 | 31 / 0 | 99.5 | 12 | 112 |
| 5 | OCF$_2$·CF$_2$H, NH$_2$ on benzene (ortho) | 0.5 | KOH(0.25) | DMF (240) | 86–93 | 1 | 61 | 15 | 91–92.5 |
| 6 | OCF$_2$·CF$_2$H, NH$_2$ on benzene (para) | 0.5 | KOH(0.25) | DMF (240) | 88–92 | 19 / 0 | 75 | 11 | 106–108 |
| 7 | OCF$_2$·CF$_2$H, CH(C$_2$H$_5$)CH$_3$ on benzene | 0.5 | KOH(0.125) | DMF (240) | 87–100 | 18 / 0 | 92 | 20 | 94 |
| 8 | CHO, OCF$_2$·CF$_2$H on benzene | 0.5 | KOH(0.25) | DMF (240) | 91–97 | 33 / 0 | 67 | 12 | 100–102 |
| 9 | CHO, OCF$_2$·CF$_2$H on benzene | 0.5 | KOH (0.25) | DMF (240) | 94–98 | 00 / 1 | ~49 | 13 | 103 |
| 10 | CH$_3$, OCF$_2$·CF$_2$H on benzene | 0.5 | KOH(0.125) | DMF (240) | 46–57 | 57 / 0 | 81 | 12 | 61 |

Table 1-continued

| Example No. | Product | charge Phenol (mole) | catalyst (mole) | solvent (g) | reaction temperature (°C) | reaction time (min.) hours | yield % of the theory | boiling point (°C) mm | melting point (°C) |
|---|---|---|---|---|---|---|---|---|---|
| 11 | (methylphenyl-OCF$_2$·CF$_2$H) | 0.5 | KOH(0.125) | DMF (240) | 85–96 | 26 / 0 | 89.4 | 13 | 59 |
| 12 | " | 0.5 | KOH(0.125) | DMSO(270) | 86–100 | 31 / 0 | 63.7 | | |
| 13 | " | 0.5 | KOH(0.125) | HPTA(255) | 83–78 | 51 / 0 | 83.7 | | |
| 14 | " | 0.5 | NaOH(0.125) | DMF (240) | 93 | 51 / 0 | 69.5 | | |
| 15 | " | 0.5 | K$_2$CO$_3$(0.125) | DMF (240) | 90–91 | 27 / 1 | 76 | | |
| 16 | (1,2-bis(OCF$_2$·CF$_2$H)benzene) | 0.5 | KOH (0.25) | DMF (240) | 88–90 | 41 / 2 | 83.8 | 32 | 97–100 |
| 17 | (2-acetamido-phenyl OCF$_2$·CF$_2$H) | 0.5 | KOH(0.125) | DMF (240) | 93–95 | 32 / 0 | 99.6 | — | 117 |
| 18 | (2-naphthyl OCF$_2$CF$_2$H) | 0.5 | KOH(0.125) | HPTA(255) | 60–54 | 00 / 4 | 68.6 | — | 29 |

DMF = Dimethylformamide
DMSO = Dimethylsulfoxide
HPTA = Hexamethyl-phosphoric acid trisamide

We claim:

1. In a process for the preparation of an aryl-1, 1,2, 2-tetra-fluoroethyl ether by reacting a phenol with tetrafluorethylene in an organic solvent in the presence of an alkaline catalyst at elevated temperatures, the improvement comprising reacting a phenolic compound selected from thee group consisting of phenol, naphthol and phenol substituted by 1 to 3 substituents selected from the group consisting of alkyl of 1 to 20 carbon atoms, alkoxy of 1 to 6 carbon atoms, hydroxy, formyl, amino, monoalkylamino of 1 to 4 carbon atoms, dialkylamino of 1 to 4 carbon atoms in each alkyl moiety, piperidino, morpholino and alkanoylamino of 1 to 5 carbon atoms in the alkane moiety, with tetrafluoroethylene in a water-miscible polar inert solvent with about 0.05 to about 0.5 mol of potassium hydroxide per each equivalent of phenolic hydroxy group at a temperature of about 50° to about 150°C and a pressure varying between atmospheric pressure and slightly subatmospheric pressure.

2. The process as claimed in claim 1, wherein the phenolic compound is phenol, naphthol or phenol substituted by lower alkyl, amino, formyl, hydroxy or acetamino.

3. The process as claimed in claim 1, wherein the solvent is dimethyl formamide.

4. The process as claimed in claim 1, wherein the solvent is dimethylsulfoxide.

5. The process as claimed in cliam 1, wherein the solvent is phosphoric acid tris-(dimethylamide).

6. The process as claimed in claim 1, wherein the reaction mixture contains about 10 to about 30 percent by weight of phenolic compound.

7. The process as claimed in claim 1, wherein the reaction mixture contains about 15 to about 20 percent by weight of phenolic compound.

8. The process as claimed in claim 1, wherein the alkali metal hydroxide is used in an amount of about 0.1 to 0.3 mol per each equivalent of phenolic hydroxy group.

9. The process as claimed in claim 1, wherein the temperature is in the range of about 70° to about 130° C.

* * * * *